United States Patent [19]

Aoki

[11] Patent Number: 5,065,009

[45] Date of Patent: Nov. 12, 1991

[54] METHOD FOR DETECTING ROLLER BREAKDOWNS IN ROLLER HEARTH KILN SYSTEMS

[76] Inventor: Michiro Aoki, 34, Takemi-cho 1-chome, Mizuho-ku, Nagoya, 467, Japan

[21] Appl. No.: 553,838

[22] Filed: Jul. 18, 1990

[30] Foreign Application Priority Data

Aug. 29, 1989 [JP] Japan .................................. 1-222180

[51] Int. Cl.$^5$ .............................................. G01V 9/04
[52] U.S. Cl. .................................. 250/222.1; 250/561
[58] Field of Search ...................... 250/222.1, 561, 221

[56] References Cited

U.S. PATENT DOCUMENTS 3,604,940  9/1971  Matthews ......................... 250/222.1
4,015,123  3/1977  Small et al. ....................... 250/222.1

FOREIGN PATENT DOCUMENTS 3601251  7/1987  Fed. Rep. of Germany .
870464  10/1981  U.S.S.R. .

Primary Examiner—David C. Nelms
Assistant Examiner—Stephone Allen

[57] ABSTRACT

A method for detecting roller breakdowns in a roller hearth kiln is provided, wherein: a light shielder is provided at the follower end of each roller in said roller hearth kiln, and two sets of light transmitters and two sets of light receivers are provided on two straight lines between which the axis of rotation of each shielder is positioned, whereby whenever light rays transmitted from said two sets of light transmitters to said two sets of light receivers are not periodically put on and off, at least one of said rollers is taken as breaking down.

14 Claims, 5 Drawing Sheets

32

15 tran. : transmitting
cut.-off : cutting-off

FIG. 9
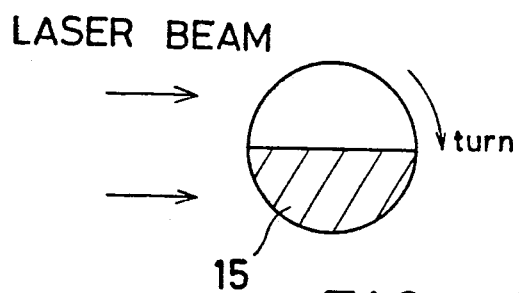
FIG. 8(A)
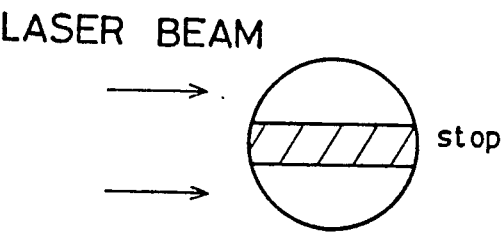
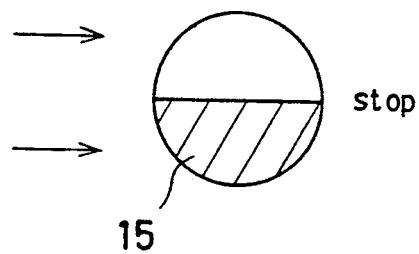
FIG. 8(B)
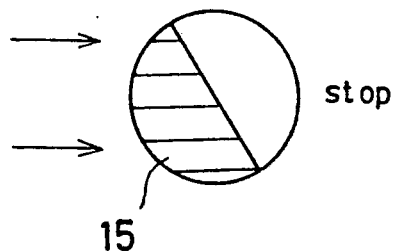
FIG. 8(C)

METHOD FOR DETECTING ROLLER BREAKDOWNS IN ROLLER HEARTH KILN SYSTEMS

BACKGROUND OF THE INVENTION

The present invention relates to a detector for detecting roller breakdowns in a roller hearth kiln used to sinter ceramics.

In general, this type of roller hearth kiln includes a number of rollers arranged through the kiln wall, each roller being provided on its one side with a driving sprocket adapted to be driven by an endless chain. If one of the rollers breaks down in the kiln, then such a roller hearth kiln can never provide any smooth feeding of a workpiece over that roller.

One typical method for detecting a roller breakdown is set forth in Japanese Patent Publication No. Sho 5614951 (14951/1981). According to this method, a metal sheet is attached to the follower end of each roller. When the roller breaks down, the metal sheet moves under the action of a spring in the axial direction of the roller. Then, a proximity switch or the like senses such a movement to detect the rollers breakdown. Because of needing a device for driving the rollers, while axial pressures are always applied to them by means of springs, this method has difficulty in its application to a roller hearth kiln of the structure wherein the rollers are merely supported by backing rollers.

In view of that difficulty, the present inventor has already invented a method for detecting roller breakdowns as mentioned below. According to this method, each roller is provided on its follower end with a rectangular metal sheet, the rotation of which is picked up in the form of an on-off signal by a limit switch. If on and off signals alternate within a preset time, then the roller is taken as turning normally, whereas if on and off signals do not alternate within a preset time, then the roller is taken as breaking down. A problem with this method, however, is that initial costs rise and electrical circuits are complicated, since each roller should be provided with an additional sensor such as a limit switch.

SUMMARY OF THE INVENTION

A primary object of the present invention is to provide a reliable and rapid detection of a breakdown of at least one of rollers arranged in a roller hearth kiln whenever it occurs.

Another object of the present invention is to provide a detection of a roller breakdown with a simplified roller-supporting structure.

A further object of the present invention is to provide a reliable detection of a roller breakdown, using optical sensors in place of mechanical sensors such as limit switches.

According to one aspect of the present invention, there is provided a method for detecting roller breakdowns in a roller hearth kiln, wherein;

a light shielder is provided at the follower end of each roller in said roller hearth kiln, and two sets of light transmitters and two sets of light receivers are provided on two straight lines between which the axis of rotation of each shielder is positioned, whereby whenever light rays transmitted from said two sets of light transmitters to said two sets of light receivers are not periodically put on and off, at least one of said rollers is taken as breaking down.

According to another aspect of the present invention, there is provided a system for detecting roller breakdowns in a roller hearth kiln, comprising in combination:

a group of rollers arranged side by side in said kiln in its tunnel direction, means for rotating said rollers of said group of rollers in phase or at the same angles of rotation, recessed shielders provided at ends of said rollers, a first light transmitter for emitting a light ray which traverses a position lying above the axis of each roller, a position inside of the outermost diameter of each shielder and a position eccentric with respect to the axis of each roller, said light ray being either passed in the vicinity of each shielder in a direction normal to the axis of each roller on a plane defined by said group of rollers or cut off by each shielder depending upon where each shielder turns, a first light receiver located at a position above the axis of each roller and capable of receiving said light ray emitted from said first transmitter, a second light transmitter for emitting a light ray which traverses a position below the axis of each roller, a position inside of the outermost diameter of each shielder and a position eccentric with respect to the axis of each roller, and a second light receiver located at a position below the axis of each roller and capable of receiving the light ray emitted from said second transmitter.

In preferred embodiments, the shielder may be of either a semicircular shape or a fan shape in cross section. The shielder is attached to the follower end of each roller. The shielder may be an integral part of the roller. Alternatively, the shielder may be provided separately from the roller. The light rays may be laser beams or visible or infrared rays.

In the system according to the present invention, the first and second transmitters and the first and second receivers may be located in each of zones provided over a given length in the longitudinal direction of the kiln. The first or second transmitter and the first or second receiver may be located on both ends of the kiln, as viewed in its longitudinal direction.

The means for rotating the rollers in phase may be a driving chain. The driving chain may then be a double-driving chain comprising a first chain for driving every other one of roller groups and a second chain for driving every another one.

When the rollers turn normally, the light rays transmitted from the first and second transmitters to the first and second receivers are periodically cut off by the shielders. In other words, the two light rays are repeatedly and precisely transmitted and cut off in a constant cycle. If the light rays are put on and off in a constant cycle, then the rollers turn normally.

Whenever at least one of the rollers breaks down, at least one of the light rays is cut off by the breaking-down roller. Thus, the roller breakdown can be reliably detected by signals from the first and second receivers which are designed to sense that at least one of the light rays is continuously cut off with time.

BRIEF DESCRIPTION OF THE DRAWINGS

The present invention will now be explained in greater detail, by way of example, with reference to the accompanying drawings, in which:

FIG. 8 is a view illustrative of the relation between the angle of the shielder and light rays, and FIG. 9 is a view illustrative of the relation between a comparative shielder and light rays.

PREFERRED EMBODIMENT OF THE INVENTION

Embodiment of the invention will now be described by way of example with reference to drawings.

Figure 3:
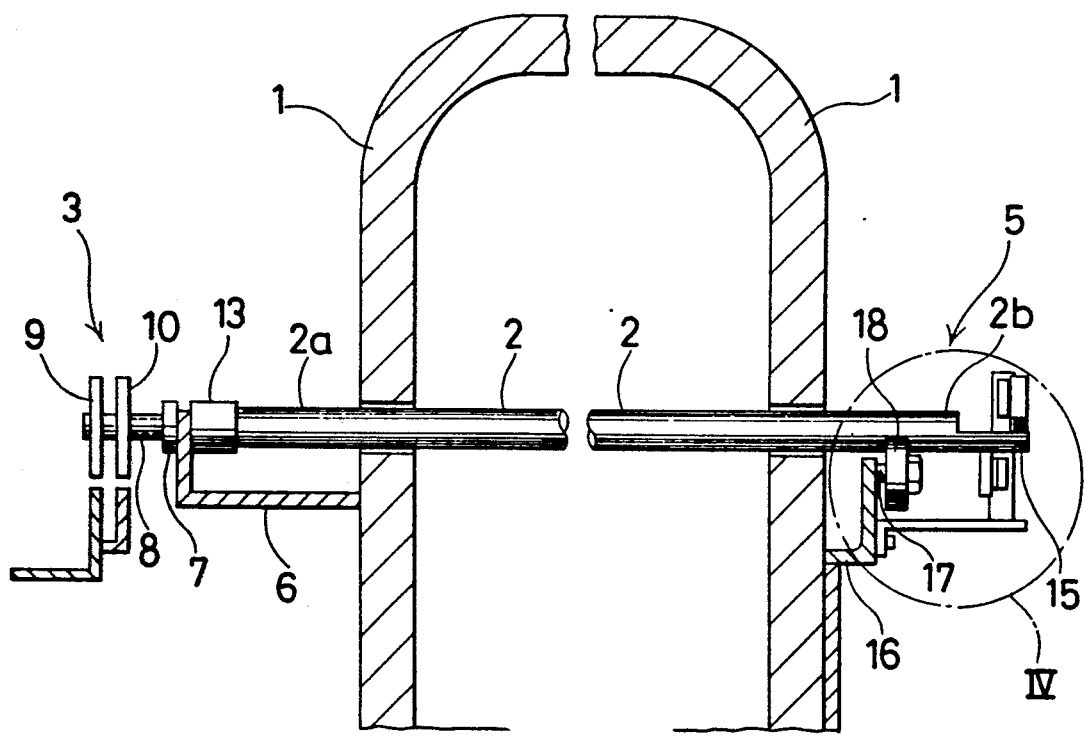
FIG. 3 is a cross-sectional view showing a roller hearth kiln system according to the present invention.
Figure 4:
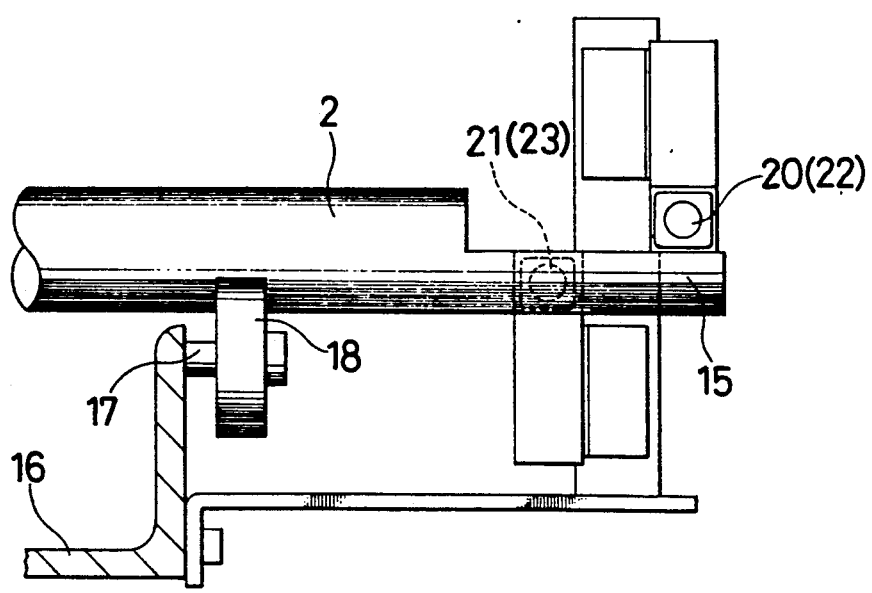
FIG. 4 is an enlarged view illustrating a zone shown at IV in FIG. 3.

As illustrated in FIG. 3, a number of ceramic rollers 2 in the form of hollow pipes are arranged side by side through a kiln wall 1 of a roller hearth kiln and at positions lying intermediate between its top and its bottom, and rotate to carry a piece to be sintered thereover, during which that piece is sintered. Each or the roller 2 is held at one end 2a by driving means 3 and supported at the other end 2b by supporting means 5.

The driving means 3 includes a driving shaft 8 rotatably supported on a supporting frame 6 through a bearing 7. The driving shaft 8 is connected to a driving motor, not shown, through a sprocket 9 fixed at its end and a chain wound around it. The driving shaft 8 is connected to the one end 2a of the roller 2 by a holder 13. Thus, a driving force is transmitted from the driving motor to the one end 2a of the roller 2 by way of the chain, sprocket 9, driving shaft 8 and holder 13.

A roller, not shown, located adjacent to the roller 2 shown in FIG. 3 is fixed to a sprocket 10. The sprockets 9 and 10 are located at positions at which they do not interfere with each other. Thus, a group of sprockets 9 are arranged relative to a group of sprockets 10 in the longitudinal direction of the kiln.

The supporting means 5, on the other hand, is rotatably supported by two backing rollers 18 located adjacent to the other end 2b of the roller 2. The backing rollers 18 are rotatably attached to a fixed shaft 17 through a bearing, not shown, said shaft 17 being attached to a bracket 16 fixed to the kiln wall 1.

Figure 1:
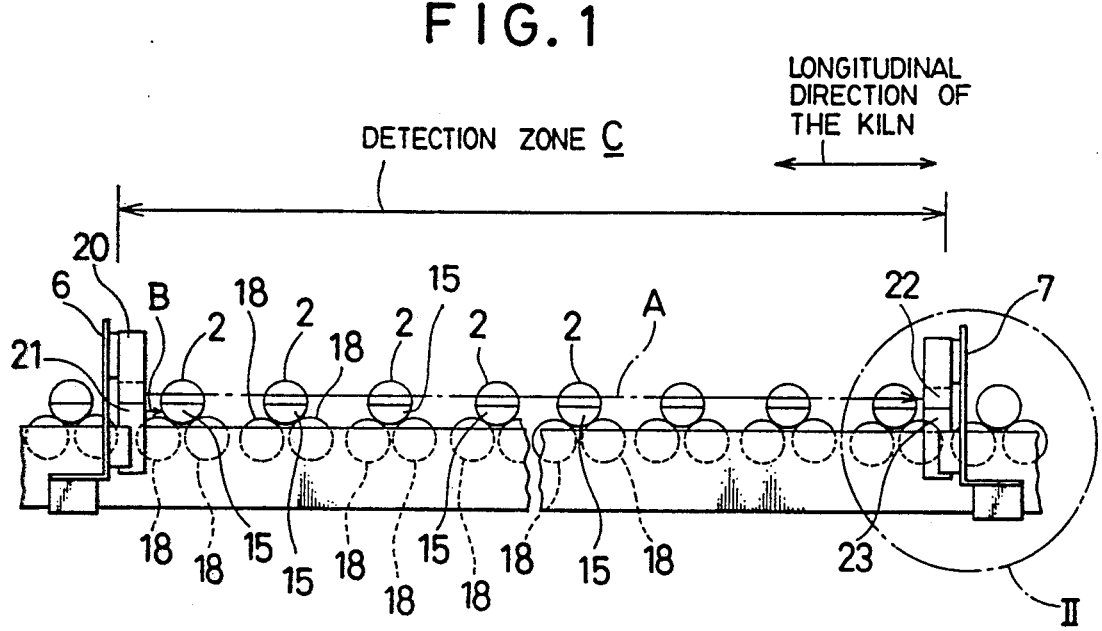
FIG. 1 is a side view illustrating a detection zone in a roller hearth kiln according to one embodiment of the present invention.
Figure 2:
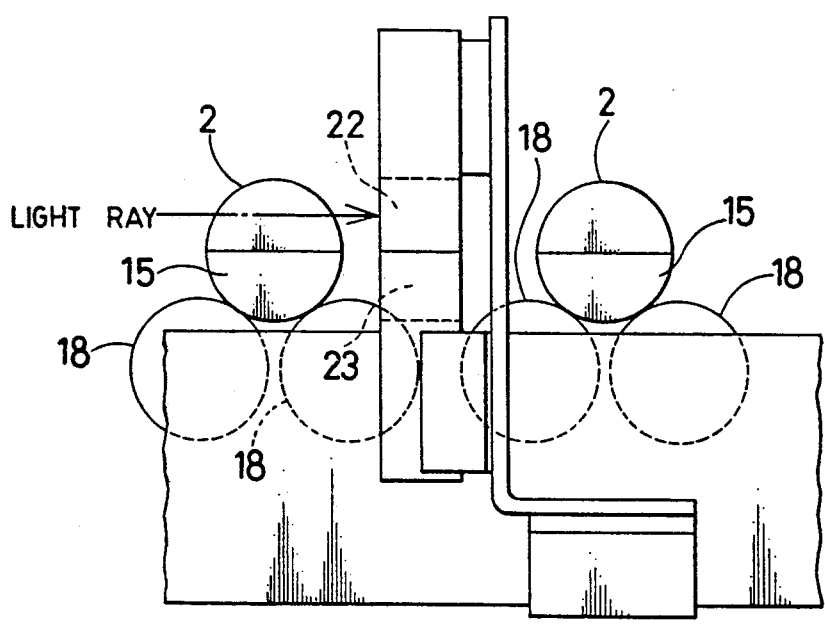
FIG. 2 is an enlarged view illustrating a zone shown at II in FIG. 1.

The roller 2 is provided at the other end 2b with a light shielder 15 which is coaxial with the axis of the roller 2 and is of a semicircular shape in cross section. As shown in FIG. 1, the shielders 15 attached to the rollers 2 arranged side by side in the longitudinal direction of the kiln are all in phase.

Referring now to FIG. 1, first and second light transmitters 20 and 21, e.g., laser beam transmitters, are located at one end of a detection zone C for detecting roller breakdowns in the roller hearth kiln. The detection zone C has at the other end first and second light receivers 22 and 23 for receiving laser beams emanating from the transmitters 20 and 21.

In a state shown in FIG. 1, a laser beam, shown at A emitted from the first transmitter 20 located above the rollers' axes travels over the rollers, axes and reaches the second receiver 22. On the other hand, a laser beam, shown at B. emitted form the second transmitter 21 located below the rollers' axes is cut off by the light shielders 15, so that it cannot reach the second receiver 23.

Reference will now be made to the reason why two sets of the first transmitter 20/receiver and the second transmitter 21/receiver are provided. If only a single transmitter/receiver set is provided, then any roller breakdown may not be detected. This is because assuming that a roller breaks down and stops and rests at an angle at which the laser beam transmits through it (i.e., at an angle at which the laser beam is not cut off by the shielder 15), then the laser beam is not cut off by that breaking-down roller and is periodically intercepted by the remaining, normally turning rollers. In consequence, the laser beam reaching the receiver is periodically put on and off.

Figure 5:
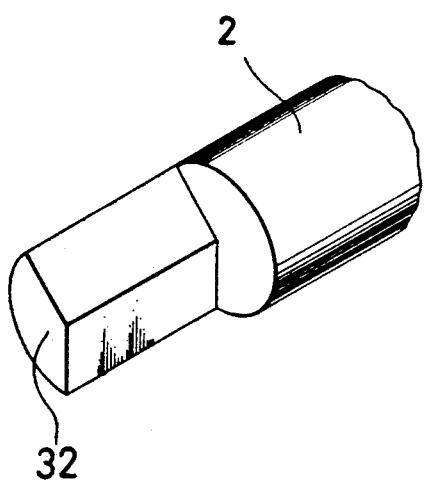
FIG. 5 is a perspective view of one example of the shielder.
Figure 6:
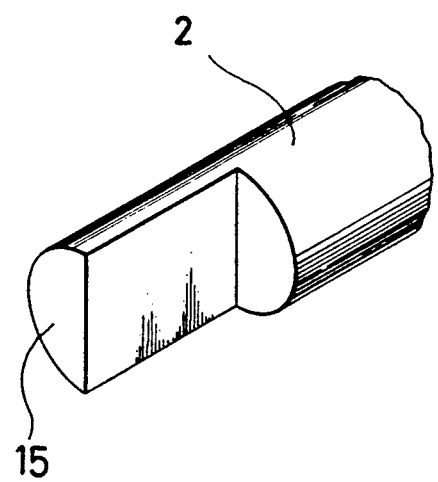
FIG. 6 is a perspective view of another example of the shielder.

Each of the shielder includes a recess through which light transmits. In the instant embodiment, the shielder 15 is of a semicircular shape in cross section, as illustrated in FIG. 6. Another shielder 32 may be used, which is of a fan shape in cross section, as illustrated in FIG. 5.

In the instant embodiment, the shielder 15 includes a recess through which light transmits, with the rest cutting off light. This is because assuming that the shielder is formed of a thin sheet 34, as shown in FIG. 9, and rests at such a position as again shown in FIG. 9 when a roller breaks down, both the laser beams emitted from the first and second transmitters 20 and 21 transmit through the breaking-down roller without cut off by the thin sheet 24, so that they produce no influence upon input signals periodically put on and off at the first and second receivers 22 and 23, failing to detect the roller breakdown.

According to the instant embodiment, whenever at least one of the laser beams emitted from the first and second transmitters 20 and 21 is received by the corresponding receiver 22 or 23, the other laser beam is cut off by the shielders 15. The first and second receivers 22 and 23 convert the on and off signals of the laser beams received there to electrical signals, which are in turn sent to a control circuit, not shown. In this control circuit, whether or not roller breakdowns occur is detected on the basis of the electrical signals.

Figure 7A:
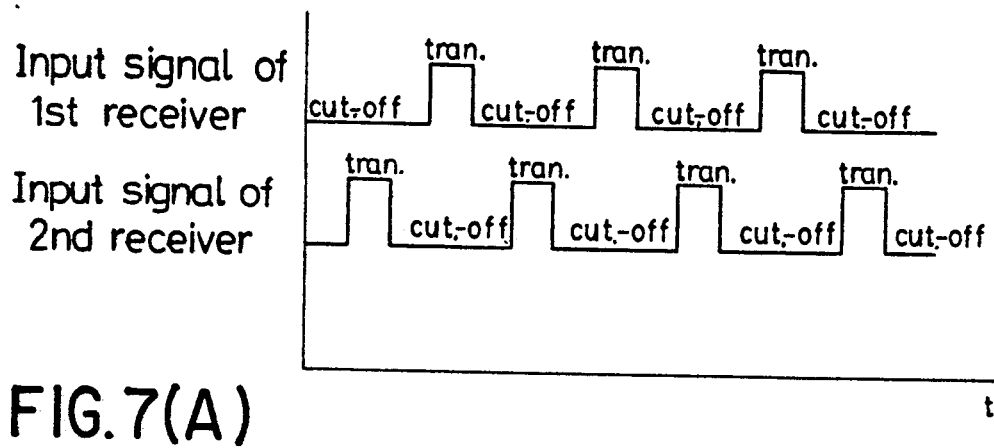
FIG. 7 is a time chart in which the input signals of the receivers are compared with each other between when a roller turns normally and when a roller breaks down.

When the rollers 2 turn normally, the laser beams emitted from the first and second transmitters 20 and 21 are alternately cut off by the shielders 15 in a constant cycle. In this case, since the shielder 15 turns as illustrated in FIG. 8A, the signals received by the first and second receivers 22 and 23 are put on and off in a constant cycle, as illustrated in FIG. 7A. The control circuit takes the rollers as turning normally, whenever the output signals of the first and second receivers 22 and 23 are put on and off in a constant cycle.

Figure 7B:
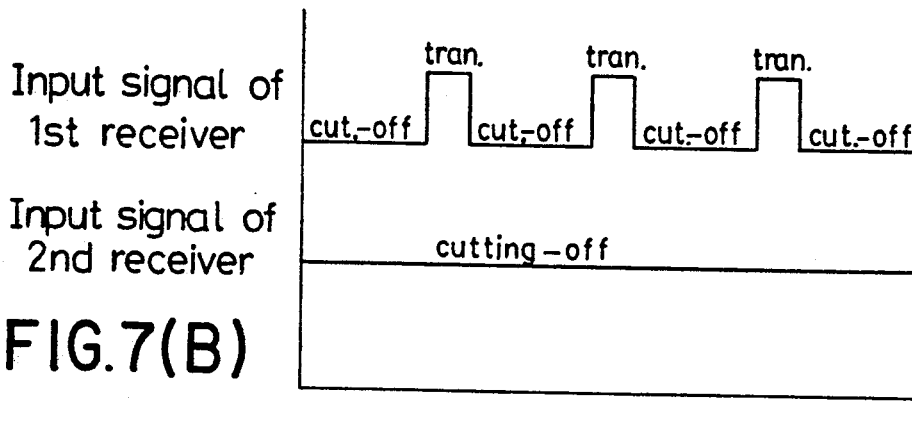

Whenever any one of the rollers 2 breaks down, the shielder 15 attached to the other end 2b thereof stops so that at least one of the laser beams emitted from the first and second transmitters 20 and 21 is cut off, even though the remaining rollers 2 rotate. For instance, when the roller 2 stops at such a position as shown in FIG. 8B, such signals as depicted in FIG. 7B are inputted to the first and second receivers 22 and 23. When the roller 2 stops at such a position as depicted in FIG.

Figure 7C:
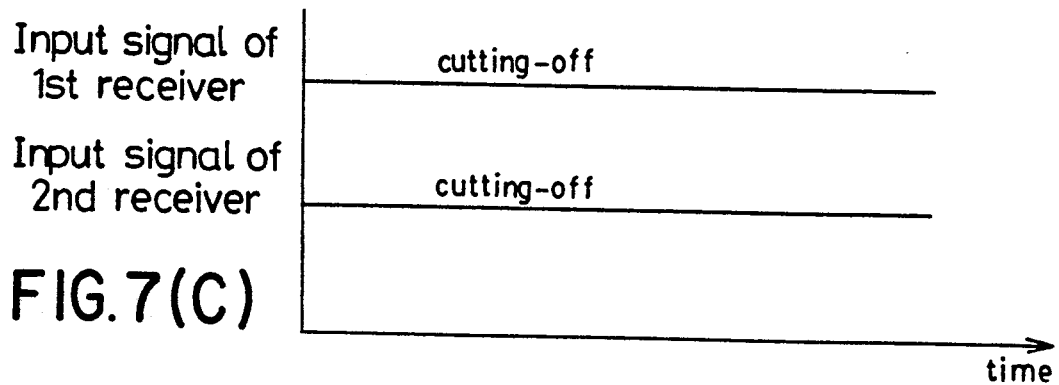

8C, on the other hand, such signals as depicted in FIG. 7C are inputted to the first and second receivers 22 and 23.

For that reason, whenever any one of rollers 2 breaks down, the laser beam sensed by the first or second receiver 22 or 23 is never put on and off in a constant cycle, thus allowing the control circuit receiving the signals from the receiver 22 or 23 to take at least one of the rollers 2 as breaking down. This provides a reliable detection of roller breakdowns.

In the embodiment as described above, laser beams of improved rectilinearity are used. It is to be understood, however, that in order to detect roller breakdowns according to the present invention, other light rays such as infrared or visible rays may be used. The foregoing embodiment has been described as being designed to detect breakdowns of rollers arranged in the detection zone positioned over a given length in the longitudinal direction of the roller hearth kiln. In the case of a kiln of short length, however, rollers arranged over its full length may be detected simultaneously.

What is claimed is:

1. A method for detecting roller breakdowns in a roller hearth kiln, wherein:
    a light shielder is provided at the follower end of each roller in said roller hearth kiln, and
    two sets of light transmitters and two sets of light receivers are provided on two straight lines between which the axis of rotation of each shielder is positioned,
    whereby whenever light rays transmitted from said two sets of light transmitters to said two sets of light receivers are not periodically put on and off, at least one of said rollers is taken as breaking down.

2. A system for detecting roller breakdowns in a roller hearth kiln, comprising in combination:
    a group of rollers arranged side by side in said kiln in its tunnel direction,
    means for rotating said rollers of said group of rollers in phase or at the same angles of rotation,
    recessed shielders provided at end of said rollers,
    a first light transmitter for emitting a light ray which traverses a position lying above the axis of each roller, a position inside of the outermost diameter of each shielder and a position eccentric with respect to the axis of each roller, said light ray being either passed in the vicinity of each shielder in a direction normal to the axis of each roller on a plane defined by said group of rollers or cut off by each shielder depending upon where each shielder turns,
    a first light receiver located at a position above the axis of each roller and capable of receiving said light ray emitted from said first transmitter,
    a second light transmitter for emitting a light ray which traverses a position below the axis of each roller, a position inside of the outermost diameter of each shielder and a position eccentric with respect to the axis of each roller, and
    a second light receiver located at a position below the axis of each roller and capable of receiving the light ray emitted from said second transmitter.

3. A system as claimed in claim 2, wherein each shielder is of a fan shape in cross section.

4. A system as claimed in claim 2, wherein each shielder is of a semicircular shape in cross section.

5. A system as claimed in any one of claims 2-4, wherein each shielder is attached to a follower end of each roller.

6. A system as claimed in any one of claims 2-4, wherein each shielder is an integral part of each roller.

7. A system as claimed in any one of claims 2-4, wherein each shielder is provided separately from each roller.

8. A system as claimed in any one of claims 2-4, wherein said light rays are laser beams.

9. A system as claimed in any one of claims 2-4, wherein said light rays are visible rays.

10. A system as claimed in any one of claims 2-4, wherein said light rays are infrared rays.

11. A system as claimed in any one of claims 2-4, wherein said first transmitter, said second transmitter, said first receiver and said second receiver are located in each of zones provided over a given length in the longitudinal direction of said kiln.

12. A system as claimed in any one of claims 2-4, wherein said first or second transmitter and said first or second receiver are located on both ends of said kiln, as viewed in its longitudinal direction.

13. A system as claimed in any one of claims 2-4, wherein said means for rotating said rollers in phase is a driving chain.

14. A system as claimed in claim 13, wherein said driving chain is a double-driving chain comprising a first chain for driving every other one out of roller groups and a second chain for driving every another one.

* * * * *